United States Patent Office 2,910,267
Patented Oct. 27, 1959

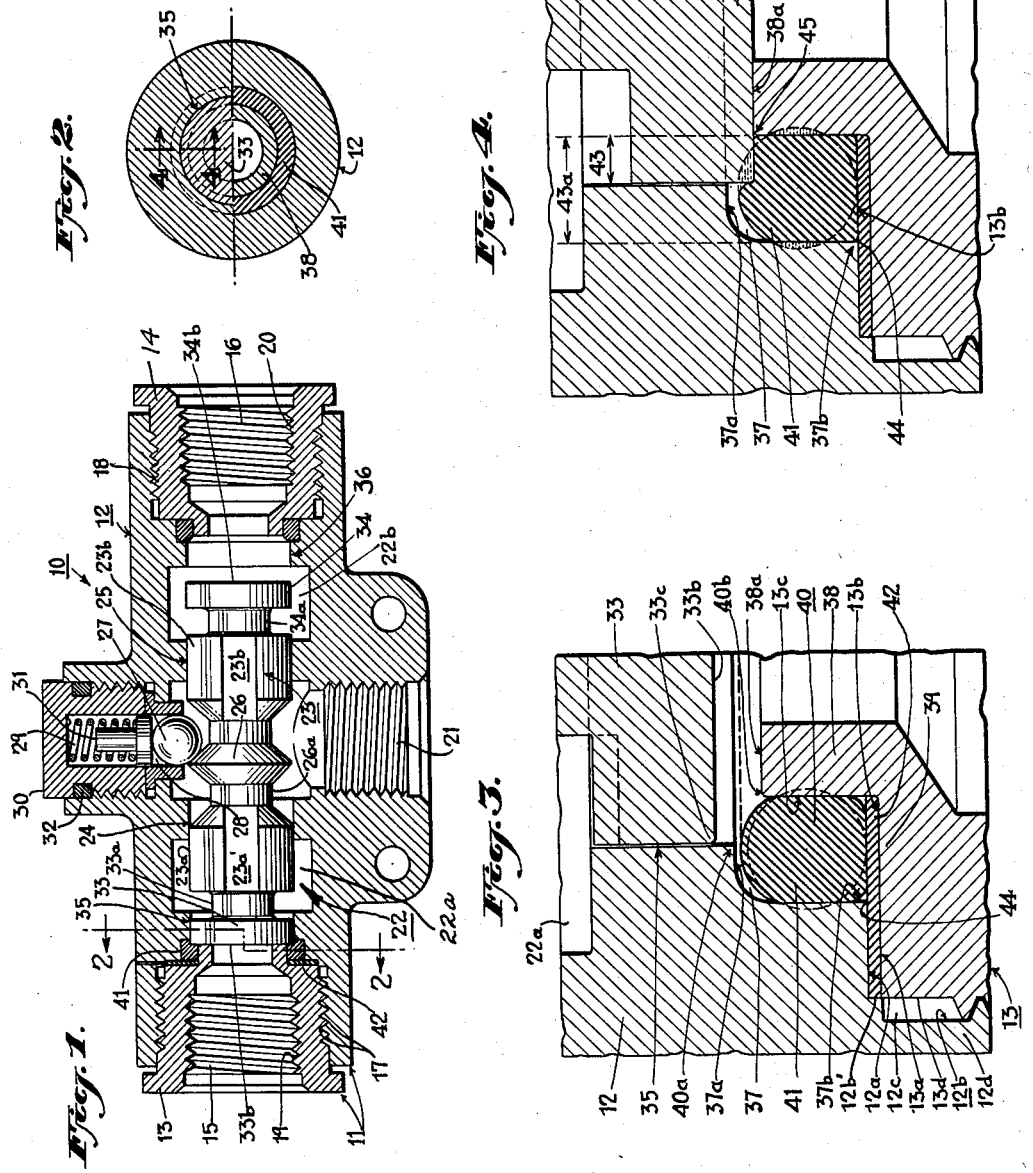

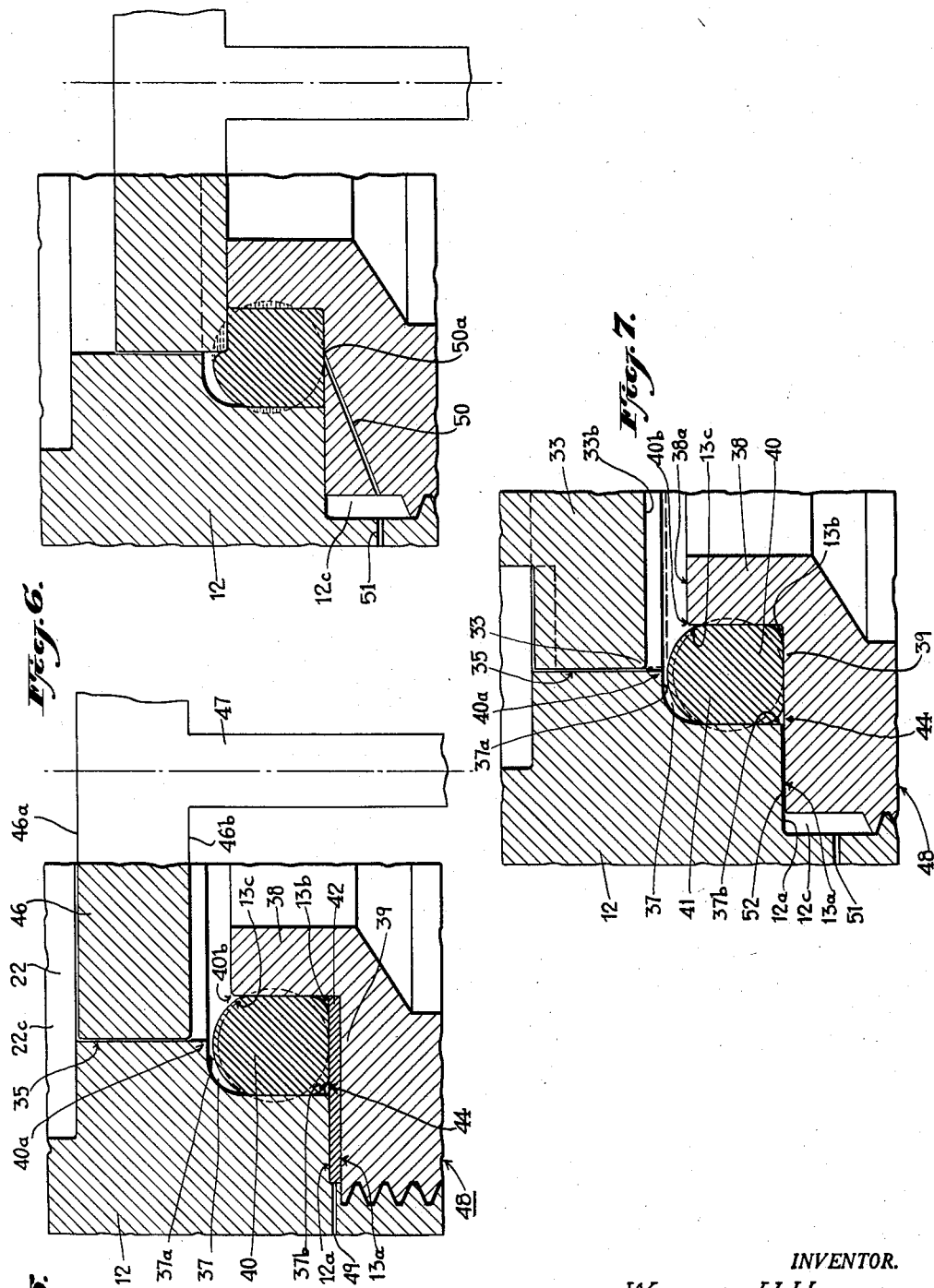

2,910,267

VALVE SEALING STRUCTURE

Worrell H. Holby, New Rochelle, N.Y., assignor to Hydra-Power Corporation, New Rochelle, N.Y., a corporation of New York Application August 9, 1955, Serial No. 527,245

7 Claims. (Cl. 251—332)

This invention relates to valve structures, and more particularly to resilient valve sealing means effective within an extremely wide pressure range and which are resistant to damage by the flow of fluid under high pressure and at high velocity.

One of the objects of the present invention is to provide an O-ring type of valve sealing structure having novel means for insuring the holding of the O-ring within a housing or chamber therefor, thereby to prevent damage to or extrusion of the O-ring, despite the flow of fluid at extreme pressure and velocity in contact with such O-ring.

A further object is to provide a novel valve sealing device for high pressure fluid systems wherein a valve closure is provided which is substantially entirely leakproof both at a relatively low and at extremely high fluid pressures, for example, within the range of the order of a few pounds per square inch up to many thousands of pounds per square inch.

Another object is to provide a novel valve sealing structure which employs a deformable sealing element, such as an O-ring of rubber-like material, and which sealing element is capable of successfully resisting extrusion when a portion thereof is subject to extreme fluid pressure differential, and which also is capable of successfully resisting "washout" from its retaining chamber resulting from extreme turbulence of the fluid flowing therepast or by the extreme rate of fluid flow.

A still further object is to provide a valve structure of this general type having sealing means which are simple and inexpensive to manufacture and which are well adapted for mass production techniques.

The invention in one aspect thereof is constituted by a valve structure which is provided with a valve body having therein a passage of selected diameter. A valve element is axially movable in such passage and is coaxially disposed therein. Said valve casing includes an annular sleeve portion, which may be removably secured therein, and which is positioned in and protrudes into the aforementioned passage and is coaxial therewith. The sleeve portion is provided with an annular limit-stop surface which in turn is positioned in the path of the movable valve element for limiting its travel in one direction in the passage. The casing has formed therein an annular chamber which is disposed around the periphery of the annular sleeve and thus is positioned radially outwardly thereof. The annular sleeve portion has a sleeve passage therein which is a continuation of the first-mentioned passage, both the inner and outer diameters of the sleeve portion being smaller than the diameter of the first-mentioned passage within the casing. The maximum outer diameter of the annular chamber is greater than that of the first-mentioned passage thereby forming an annular lip with the internal surface of such first-mentioned passage. A peripheral and annular edge of the sleeve member also forms an annular lip of said chamber, and the two aforementioned lips form a mouth for the annular chamber into and out of which said valve element can move. An annular sealing member of rubberlike material is positioned in such annular chamber and substantially fills same whereby that annular portion of the sealing member adjacent the mouth thereof thus is in a position for engaging an annular part of the aforementioned movable valve element thereby to be compressed. A porous member is positioned in the chamber with substantial portions of the aforementioned annular sealing member interposed between the mouth of the chamber and such porous member. Suitable passage means are provided for placing the porous member in communication with a region of lower fluid pressure than that within the aforementioned valve casing, for example, a passage is formed in the valve casing which places said porous member in communication with the atmosphere thereby insuring that portions of the annular sealing member in engagement with the porous member will be subjected to a substantially lower pressure than that within the valve casing thereby creating a pressure differential between those portions of the sealing member exposed to the fluid pressure within the casing and such portions in engagement with the porous member.

The invention in another aspect thereof is constituted by a valve structure which is substantially identical to that described in the preceding paragraph with the exception that the porous member is eliminated and that portion of the annular chamber which is substantially opposite to the mouth thereof is placed in communication with a region of lower pressure, that is, it is placed in communication with the atmosphere by means of minute passages which are formed in the valve casing or body. This latter form of the invention is particularly adapted for use with fluids at lower pressures than the form in such preceding paragraph.

Various, further and more specific objects, features and advantages of the invention will more clearly appear from the detailed description given below taken in connection with the accompanying drawings which form a part of the specification and illustrate, by way of example, certain preferred arrangements of apparatus for carrying out the invention. The latter consists in such novel combinations of features as may be shown and described in connection with the devices herein disclosed.

In the drawings:

Fig. 1 is a longitudinal view, partly in section and with parts broken away, illustrating a valve assembly embodying one form of the invention;

Fig. 2 is a sectional view taken substantially along line 2—2 of Fig. 1;

Fig. 3 is a fragmentary sectional view on a scale which is enlarged with respect to Figs. 1 and 2 and which shows the details of the novel valve structure with the parts thereof in one operating position;

Fig. 4 is a view similar to Fig. 3 with the parts of the apparatus in a different operating position, and taken substantially along line 4—4 of Fig. 2;

Fig. 5 is a fragmentary sectional view somewhat similar to the apparatus shown in Fig. 3 but illustrating a modification of the invention shown in the latter figure;

Fig. 6 is a further fragmentary sectional view on an enlarged scale of another modification of the present invention; and Fig. 7 is another fragmentary view of apparatus embodying still a further modification of the invention.

Referring to the drawings in greater detail, with particular reference to Fig. 1, the novel valve structure is shown in connection with, for example, a shuttle valve, which is indicated generally at 10 and which has a valve body also generally indicated at 11. The latter includes a valve casing 12 and end plugs or sleeve members 13 and 14, each being provided with a passage therethrough 15 and 16, respectively. The sleeve members 13 and 14 are secured at opposite ends of the valve casing 12 by means of threads 17 and 18, respectively. If desired, the internal surfaces of the sleeve members 13 and 14 may be threaded, the threads being shown at 19 and 20, respectively, to receive correspondingly threaded conduits. The passages 15 and 16, respectively, constitute inlet ports in the form of the valve construction of Fig. 1, such inlet being for the passage of fluid to an outlet 21 via a valve casing passage generally indicated at 22. The outlet preferably is centrally disposed and can be supplied selectively from either of the inlets 15 or 16 depending upon the location of a shuttle valve element 23.

The shuttle valve element 23 is reciprocably mounted in the valve casing bore 22 by means of journal portions 24 and 25 having cylindrical inner surfaces for embracing cylindrical portions 23a and 23b of the shuttle valve 23. The latter shuttle valve, in the absence of fluid under pressure, is urged toward either one or the other of its extreme positions by means of a spring detent device consisting of a rib 26 formed upon the shuttle valve element 23 intermediate the cylindrical portions 23a, 23b, and a detent ball 27 which is axially shiftable within a bore 28 under the influence of a spring 29 which is held in operative position in the bore 28 by means of a closure cap 30 which is threadedly secured to the casing in a well known manner. The spring 29 exerts pressure on the ball 28 through the intermediary of a spring pin 31. Suitable packing 32 is provided to prevent leakage between the casing 12 and the closure cap 30. Other packing may be employed as desired. The rib 26 preferably is in the form of a pair of frusto-conical members having a common base.

Located outwardly of the cylindrical portions 23a, 23b are valve elements 33 and 34 respectively which preferably are an integral part of the shuttle valve element 23, but which are interconnected thereto by relatively restricted portions 33a and 34a. Said portions 33a and 34a may be equal in diameter to a central region 26a of the shuttle valve from which the rib 26 protrudes. The valves 33 and 34 are provided with flat outer end faces 33b, 34b, respectively, for cooperation with and acting as a part of the valve sealing means, as will appear more fully hereinafter.

In view of the fact that the journal portions 24 and 25 embrace the cylindrical shuttle valve portions 23a and 23b, it is necessary to form slots 23a' and 23b' in the latter, in order to permit fluid flow therepast. Any number of such slots may be formed.

Each of the valve elements 33 and 34 is preferably cylindrical in conformation and is movable to a position where it is embraced by its respective cylindrical passage portion 35 and 36, also referred to as a valve element chamber, such portions being relatively of smaller diameter than adjacent enlarged flow chambers 22a, 22b. The tolerance between the valve elements 33 and 34 and the cylindrical passage portions 35 and 36 is relatively close, that is, adequate to permit piston-like movement of such elements therein, although it does not permit fluid flow in any appreciable volume. In the form shown, the passage 22 is provided with such enlarged flow chambers 22a and 22b into which the valve elements 33 and 34 are respectively movable one at a time, depending upon the axial position of the shuttle valve 23 as a whole. Movement of a valve element, for example 34 (Fig. 1) fully into its respective enlarged flow chamber 22b, of course, results in a full opening of the valve closure at the righthand side of such structure whereby fluid entering the inlet 16 may pass to the outlet 21 via the enlarged passage portion 22b and the slot 23b'.

Referring now to Figs. 3 and 4, there will be described in detail one form of the novel valve structure embodying the invention, one of the principal purposes of which is to insure the existence of an adequate pressure differential on opposite sides of a deformable sealing member thereby to prevent a "washing out" of such member or a damaging thereof. Only one of the novel structures will be described of the two shown in Fig. 1, such structure being indicated on the lefthand portion of Fig. 1. It is, of course, understood that the sealing means on the righthand portion is identical thereto.

Referring to Figs. 3 and 4, the valve casing 12 is provided with the aforementioned relatively restricted cylindrical passage 35 which embraces the periphery of the valve element 33 and is separated therefrom by a preselected small tolerance adequate to permit axial piston-like movement of the valve element 33 in the passage. A recess 37 is formed internally of the valve casing next adjacent to said restricted cylindrical passage 35, such recess being in the form of an internal groove coaxial with the passage 35. The surfaces of the annular recess 37 form, in cooperation with the outer surfaces of a removably mounted rigid ring 38 or sleeve portion of the sleeve member 13, an annular chamber indicated generally at 40 for holding a deformable annulus 41, the latter being preferably of synthetic or natural rubber or some deformable rubber-like material. The annulus 41 is also referred to as a sealing ring or an O-ring and normally is of circular transverse cross-section when removed from the chamber 40, although this, of course, is not a mandatory characteristic.

The recess 37 and the rigid sleeve portion 38 form said annular groove 40 as follows, in the form shown in Fig. 3.

The recess 37 is provided with an inner end face 37a and an outer side face 37b. Formed in the valve casing 12 outwardly of the recess 37 and next adjacent to the outer side face 37b is a casing end face 12a designed for clamping between it and a sleeve-end face 13a, an annular washer 42 preferably of sintered porous metal. The porous annular washer 42, in lieu of being composed of sintered powdered metal, can be of any other suitable porous material, such as leather, which is capable of placing the areas of the O-ring 41 engaging same in communication with the atmosphere via the pores of such material thereby to create a relatively low pressure area at that region. Thus the occurrence of extreme pressure and turbulence on those areas of the O-ring exposed to the fluid passing through the valve body, e.g., through the passages 22, 15, are prevented from damaging the O-ring, for example, from forcing or washing it out of its annular chamber or from subjecting it to attrition by partially extruding same.

The sleeve-end face 13a, of course, is a portion of the sleeve member 13. The latter, peripherally of the rigid sleeve portion 38 thereof, is provided with annular faces 13b and 13c which cooperate with the aforementioned faces 37a and 37b to form the annular chamber 40. Faces 13b and 13c may be considered as one continuous face as can the faces 37a and 37b. It is, of course, understood that the aforementioned face 13b, as is well shown in Fig. 3, is not accessible to the O-ring 41 and thus is not engaged by it because of the interposition of an inner portion of the porous washer 42. Thus the annular chamber 40 is partially occupied by at least a portion of the porous washer 42. The above-mentioned face 13b may or may not be coplanar with the sleeve-end face 13a but, in the form shown, it is desirable for such faces to be coplanar in order to facilitate the clamping of the porous member 42 between the above-described faces 13a and 12a. Some facility in the manufacture of the porous washers 42 is achieved and the cost thereof is lowered if they are not required to be of a complicated shape. Consequently it is desirable for the washer 42 to be a flat annulus, as shown, although the invention is not necessarily limited to this particular conformation.

In order to provide a limit-stop for the axial movement of the valve element 33, the aforementioned sleeve portion or rigid ring 38 is positioned in such a manner that its flat annular face 38a is in the path of movement of the valve element 33 and is conformed to engage an outer valve face 33b of such element 33 in a manner well shown in Fig. 4.

The mouth of the annular chamber 40 is defined by annular lips 40a and 40b, the former being formed by the intersection of the face 37a with the surface of passage 35, and the latter by the intersection of the limit-stop face 38a and said annular face 13c. The width of the mouth of the chamber 40, that is, the distance between the lips 40a and 40b is so selected that it aids in preventing the annulus or O-ring 41 from being "washed out" of the chamber 40 in response to extreme turbulence or high flow in the passage 22 when the valve is opening or is fully opened. However, the aforementioned dimension of the mouth, that is, the distance between such lips 40a, 40b, is not the sole determining factor for preventing the washing out of the O-ring 41, the principal factor being the creation of the aforementioned pressure differential between the upper and lower surfaces of the O-ring, as viewed in Fig. 3, such pressure differential occurring by virtue of provision of the porous washer 42. Because of the construction shown, it is furthermore not possible for a so-called wire drawing or extrusion effect to dislocate or damage the O-ring 41 while the valve is progressively closing or opening, and after it is closed or opened. For example, the width of such mouth in the form shown is approximately one-half of the diameter of the cross-section of the O-ring 41.

Thus the restricted cylindrical surface 35 and the plane of the flat face 38a together form a corner region with which the annular chamber 40 is in communication via its mouth.

The width of the annular mouth of said annular chamber 40, together with the conformation of such chamber, including the fluid leakage paths through the aforementioned porous washer 42, will prevent extrusion of the O-ring. Such extrusion in prior art valve structures has been due to such wire-drawing effect upon the deformable O-ring when the valve is moved from an open to a closed position and vice versa, the danger of such wire-drawing effect normally arising during the progressive closure of the valve. The danger of "washing out" of the O-ring exists not only when the valve is undergoing closing but when it is undergoing opening and is in fact open, for example, as in the righthand portion of Fig. 1, at which time extremely high fluid flow and turbulence to have this effect. However, this danger is fully overcome by this invention.

It will be noted from Figs. 3 and 4 that the inner and outer diameters of the porous washer 42 are such that it extends from the peripheral face 13c radially outwardly to an annular internal face 12b', the latter being less in radius than face 12b by the depth of the threads of the sleeve.

As aforementioned, the cross-section of the O-ring 41 is preferably normally circular and is somewhat greater in diameter than the width of the annular chamber 40, as is well shown in Figs. 3 and 4, wherein the normal circular cross-section of such ring is shown by a broken line. The deformable ring 40 preferably is initially positioned surrounding the rigid ring 38 and thereafter the latter is installed or positioned within the structure, as shown in Fig. 3, whereby the deformable O-ring is squeezed into the annular chamber 40 and undergoes the deformation shown in this fiigure wherein such annular chamber is substantially filled by the O-ring with the top portion of the latter, as viewed in Fig. 3, extending above the level of the limit-stop face 38a whereby an outer peripheral corner 33c of the valve element 33 (peripheral valve corner) can engage same as will appear below. It is, of course, understood, that prior to the installation of the O-ring 41 upon the rigid ring or sleeve member 38, the porous washer 42 is placed in position.

Referring to Fig. 4, it has been found desirable to select the dimension 43, which is the width of such chamber mouth measured radially, substantially less than the dimension 43a which is the width of such annular chamber also measured radially. In the embodiment shown in Figs. 3 and 4, the dimension 43 is less than one-half of the dimension 43a. Such selection of dimensions, in combination with the action of the porous washer 42, which permits the creation of the aforementioned pressure differential on the upper and lower surfaces of the O-ring, will:

(a) Prevent the above-mentioned "washout" of the O-ring 41 as a result of high velocity fluid flow past the sleeve member 38 or ring;

(b) Provide sufficient shielding to the O-ring 41 to prevent extrusion of any part of it during the opening or closing of the valve.

This is particularly important to those forms of the invention wherein an extremely high fluid pressure exists on the inside of the passage of the valve body, for example, within the passage 22 thereby seating the valve, as shown in Fig. 4, there being a large mechanical force, rather than a fluid pressure, which may act to urge the movable valve element 33 upwardly, as viewed in Figs. 3 and 4, thereby to unseat same whereupon the fluid under extreme pressure on the inside of the valve body will not be met by a counteracting fluid coming from the outside of the structure which, under ordinary circumstances, would minimize the turbulence and pressure differential between the inside and outside of the valve element. That is, if the fluid under pressure within the valve body 12 were to meet a fluid under slightly greater pressure on the outside of the body clearly, the pressure differential and turbulence would not be of extreme degree. By virtue of the pressure drop or pressure differential between the top of the O-ring (Fig. 3) and its base, such O-ring is urged forcefully down against the porous washer 22 and is saved from damage by the aforementioned normally damaging forces which have existed in prior art devices. The aforementioned pressure differential which is effected by placing the bottom region of the O-ring in communication with a low pressure region, is clearly of substantial importance, when fluid pressures of the order, for example, of 5,000–25,000 p.s.i. exist within the valve body. The valve element of Fig. 5 is pertinent on this point and will be described hereinafter.

Reverting again to Figs. 3 and 4, the stop-face 38a may be located below the face 37a and, of course, as aforementioned below the top surface of the O-ring 41 by a sufficient distance to insure that the valve element 33 will engage and be permitted to thrust downwardly on the upper portions of the O-ring in such a manner that it will deform substantially, as shown in Fig. 4, thereby being urged and crowded down into the annular chamber 40 into sealing relation with a washer-casing joint line 44 and a sleeve-valve joint line 45 (Fig. 4). Such washer-casing joint line (or porous member-casing joint line), as shown at 44, in the form shown, is formed along the intersection of the top surface (Fig. 3) of the porous washer 42 and the internal surface 37b. The sleeve-valve joint line 45 in the form shown occurs along the intersection of the aforementioned surfaces 13c and 33b. Furthermore, in such form of the invention shown, the intersection of such surfaces each forms a corner.

The washer-casing joint line or corner 44 is located at a region of the annular chamber 40 which has a substantial portion of the deformable O-ring 41 interposed between it and those areas of such O-ring which are accessible to fluid under pressure and/or to the valve element 33. This is accomplished by positioning such joint line or corner 44 axially removed from such high fluid pressure accessible areas of the O-ring, but towards the bottom of such annular chamber, that is, as measured along the longitudinal axis of the valve passage. In the embodiment shown, the washer-casing joint line is substantially on the bottom of the annular chamber 40.

Reverting again to Fig. 1, the righthand side of the valve is open and the lefthand side is closed. The valve element 34 consequently is positioned to the left of the cylindrical passage 36 and is in the relatively enlarged flow chamber 22b, fluid thus being permitted to flow through the passage 16, the cylindrical passage 36, the flow chamber 22b, the slot 23b' and thence to the outlet 21. When the valve element 34 is shifted to the right to close the valve opening 16, it will be seen that fluid flow from the left side thereof will be substantially entirely stopped by virtue of the movement of the element 34 into the relatively restricted cylindrical passage 36 although it is possible for a relatively small volume of fluid to flow in the passage between the periphery of the element 34 and such closely surrounding passage 36. Nevertheless, the bulk of the flow is shut off from such left side of the valve element 34 before such element approaches closely to its seated or sealing position in engagement with the O-ring. The same, of course, is true with respect to the valve element 33 when it moves from the flow chamber 22a to the left, as viewed in Fig. 1.

Referring again to Figs. 3 and 4, it will be observed that a small chamber 12c exists between the face 12b of the valve casing 12 and upper peripheral portion 13d of the sleeve 13. This chamber 12c is in communication with the atmosphere via the circuitous path around the threads 17 (Fig. 1) and for all practical purposes is at atmospheric pressure, the normal fit between the thread 17 formed internally of the casing 12 and the sleeve member 13 being inadequate to prevent the communication of atmospheric pressure to the chamber 12c. Thus by virtue of the porous nature of the washer or porous member 42, the underside (Fig. 3) of the annulus 41 is subjected substantially to atmospheric pressure or at least to a pressure which is very substantially reduced with respect to the fluid pressures existing at the upper surfaces of the O-ring, as viewed in such figure, namely, the pressures due to the fluid under high pressure at that region.

In operation, the sequence of events which occurs when the valve element 33 (Fig. 3) shifts axially from the enlarged flow chamber 22a downwardly into the relatively restricted cylindrical passage 35 is as follows:

The bulk of the fluid flow from the high pressure side of the element is shut off by the entrance of the valve element into the passage 35. The element thereafter shifts further downwardly, as viewed in Fig. 3, from the position shown in solid lines, for example, to that shown in broken lines whereby the first contact is made between the valve element 33 in the top region of the O-ring 41. Such engagement of the valve in the O-ring is adequate immediately to prevent leakage of fluid between the valve element and the sealing ring and such initial seal is assisted by the force of the detent 27 aforementioned which urges the valve element 33 downwardly by means of the spring 29. As the valve element 33 progresses, it effects a deformation of the O-ring and simultaneously reduces the orifice through which the latter ring might possibly be extruded. During such motion of the movable valve element 33, the aforementioned pressure differential exists between the upper surfaces of the O-ring and its lower surfaces which are in engagement with the porous washer 42, such pressure differential being of the order of the differential between the fluid pressure and the pressure of the atmosphere. The valve seal effected by this novel structure is capable, of course, of withstanding pressures vastly in excess of the pressure required to deform the annulus 41, as shown in Fig. 4.

If desired, the form of the invention shown in Figs. 3 and 4 may be modified by placing the chamber 12c directly in communication with the atmosphere, for example, by means of a passage (not shown) drilled in wall 12d of the casing 12.

Referring now to the form of the invention of Fig. 5, it will be seen that such form is substantially identical to that shown in Fig. 3, with the exception that a valve element 46 is provided which is somewhat different from the movable valve element 33 of Fig. 3 in that it is provided with a central valve shaft 47 which protrudes in an opposite direction, for example, outwardly of the valve body 12. This is significant in those types of valves wherein a mechanical thrust, as opposed to a fluid pressure, is exerted on one side of the valve element for the purpose of moving same. Thus, by way of example, fluid under extreme pressure may be acting upon the upper surfaces (Fig. 5) of the valve element 46 and in fact no fluid pressure (except atmospheric) may be acting upon the lower surfaces thereof, such upper surfaces being indicated at 46a and lower surfaces at 46b. A physical or mechanical thrust acting upwardly, as viewed in Fig. 5, on the valve shaft 47, will, of course, lift the movable valve element 46 and eventually advance same into the enlarged flow passage 22c and the fluid under extreme pressures therein will be permitted to rush outwardly through the passage of a sleeve member 48 (substantially similar to sleeve 13). By virtue of the absence of a counterbalancing fluid under pressure in the passage 15, the extreme fluid pressure and turbulence occurring in the region of the O-ring would, in the absence of a suitable pressure differential acting on opposite sides of the O-ring, tend to destroy the latter. However, such pressure differential does in fact exist thereby preventing any damage to such O-ring. The sleeve member 48, shown in Fig. 5, is identical to the sleeve member 13 of Fig. 3 with the exception that it is so conformed that the chamber 12c of Fig. 3 is occupied by threads which engage one another as is well shown in Fig. 5. That is, the threads formed internally upon the bore of the valve casing for receiving such sleeve member 13 extends substantially up to the porous member 42 and provide a support for the outer marginal portion thereof in the sense that the area which is clamped between the face 13a and the face 12a is of greater extent as compared to Fig. 3. That is, the clamping areas 12a and 13a are enlarged to the extent of the width of the chamber 12c as measured radially.

Furthermore, the chamber in which the porous member 42 is clamped, that is, the region between the faces 13a and 12a is placed directly in communication with the atmosphere by one or more passages 49 which may be formed as by drilling through the valve body 12.

Referring now to the modification shown in Fig. 6, such modification is identical to that shown in Fig. 3 with the exception that the porous member 42 is omitted and the bottom face of the annular chamber 40 is placed in communication with the chamber 12c by means of a passage 50 which may be formed as shown in this figure. Such passage 50 preferably is of small diameter in order that the orifice 50a thereof situated preferably beneath the O-ring 41 (Fig. 6) will be as small as practicable in order to prevent extrusion of the O-ring therethrough under the influence of extreme fluid pressures of the order of 5,000 to 25,000 p.s.i. The chamber 12c in turn is in communication with the atmosphere via the passage 51 drilled in the valve body 12. If desired, the passage 50, at least in the region thereof near the orifice 50a, can be filled or plugged with sintered porous metallic material (not shown). In the event that such sintered porous metallic material is not so employed, the range of pressures with which the structure of Fig. 6 can be used is substantially lower than the range of pressures with which the structure of Fig. 5 can be employed. The maximum fluid pressure with which the embodiment of Fig. 5 can be employed is substantially unlimited, any limitation thereon being a function of the strength of the metal comprising the valve structure.

The modification shown in Fig. 7 is identical to that of Fig. 6 with the exception that the passage 50 is eliminated and the lower or bottom portion of the O-ring chamber 40 is in communication with the chamber 12c via a leakage path existing between the surfaces 13a and 12a, such leakage path being identified at 52. The faces 12a and 13a are machined to a normal flat configuration within normal tolerances but in the absence of extremely accurate machining of these surfaces an adequate leakage path will occur which will permit the lower portion (Fig. 7) of the annular groove 40 to be in communication with the atmosphere via the chamber 12c and the passage 51 thereby to create the aforementioned pressure differential between the upper surfaces of the O-ring 41 (as viewed in this figure) and the lower surfaces thereof. Thus the area of relatively low atmospheric pressure attributable to the leakage path 52 is relatively small and as a result the pressure differential occurring in the embodiment of Fig. 7 is substantially lower than if the leakage path were enlarged as by means of a porous washer. The pressure differential, of course, is a function of the area of the O-ring which is subjected to the low pressure. That is, if a relatively large bottom area of the O-ring is subjected to atmospheric pressure, the forces attributable to the pressure differential will be substantially greater than those existing if such low pressure area were relatively restricted as in the case of Fig. 7. Thus there is a substantial advantage to the embodiment of Figs. 3, 4 and 5 because there is a very substantial area of the O-ring on the underside thereof (as viewed in these figures) which is under the influence of relatively lower pressure of the order of atmospheric pressure, thereby substantially increasing the force with which the O-ring is held within its groove. This, of course, is true because such force is a function of pressure differential multiplied by the area upon which the pressure acts, that is, the area upon which the high fluid pressure acts on the upper regions of the O-ring and the area subjected to the relatively lower pressure adjacent the lower surfaces of the O-ring.

What is claimed is:

1. In a valve structure, a valve body having a passage therein; a valve element axially movable in such passage, said body having an annular corner region formed therein coaxial with said passage, said body having an annular chamber formed therein which also is coaxial with said passage and is positioned at such annular corner region and in communication therewith through an annular mouth thereof; an annulus of deformable material in and substantially filling such chamber and having an annular mouth portion positioned at such mouth for engagement by said valve element; and a porous member positioned along an area of said annulus which is substantially opposite to said annular mouth portion thereof, said porous member being in communication with the atmosphere via a passage in said valve body other than the passage comprising said annular chamber.

2. In a valve structure, a valve body having a passage therein; a valve element axially movable in such passage, said body having an annular corner region formed therein coaxial with said passage, said body having an annular chamber formed therein which also is coaxial with said passage and is positioned at such annular corner region and in communication therewith through an annular mouth thereof; an annulus of rubber-like material in and substantially filling such chamber and having an annular portion exposed at such mouth for engagement by said valve element; and a porous member positioned along an area of said annulus which is substantially opposite to said exposed portion thereof, said porous member being in communication with the atmosphere via a passage in said valve body.

3. In a valve structure, a valve body having a passage therein of selected diameter; a valve element movable within and axially of such passage and having an outer valve face; said body including an annular sleeve portion positioned in and protruding into such passage and coaxial therewith, such sleeve portion having an annular limit-stop surface for said valve element positioned in the path of such valve element for limiting its travel in one direction in such passage; such body having formed therein an annular chamber disposed substantially about the periphery of said annular sleeve portion; said annular sleeve portion having a sleeve passage therein comprising a continuation of said first-mentioned passage, both the inner and outer diameters of said sleeve portion being smaller than the diameter of said first-mentioned passage, the maximum outer diameter of said annular chamber being greater than that of said first-mentioned passage; the surface of said annular chamber forming an annular lip with the internal surface of said first-mentioned passage and also forming an annular lip with a peripheral annular edge of said sleeve member, said lips being axially displaced from one another thereby to form a mouth for said chamber into and out of which said valve element can move; an annular sealing member of rubber-like material in said chamber and substantially filling same whereby an annular portion of said sealing member is normally in the mouth of said chamber in a position for engaging a marginal part of said valve element thereby to be compressed; and a porous member in said chamber in engagement with said sealing member, said porous member being positioned in said chamber along an area substantially opposite to such chamber mouth, there being an annular portion of said sealing member intervening between the latter area and such chamber mouth, said body having formed therein a passage for placing said porous member in communication with the atmosphere, said passage with respect to such mouth being sealable by said sealing member.

4. In a valve structure, a valve body having a passage therein of selected diameter; a valve element movable within and axially of such passage and having an outer valve face; said body including an annular sleeve portion positioned in and protruding into such passage and coaxial therewith, such sleeve portion having an annular limit-stop surface for said valve element positioned in the path of such valve element for limiting its travel in one direction in such passage; such body having formed therein an annular chamber disposed substantially about the periphery of said annular sleeve portion; said annular sleeve portion having a sleeve passage therein comprising a continuation of said first-mentioned passage, both the inner and outer diameters of said sleeve portion being smaller than the diameter of said first-mentioned passage, the maximum outer diameter of said annular chamber being greater than that of said first-mentioned passage; the surface of said annular chamber forming an annular lip with the internal surface of said first-mentioned passage and also forming an annular lip with a peripheral annular edge of said sleeve member, said lips being axially displaced from one another thereby to form a mouth for said chamber into and out of which said valve element can move; an annular sealing member of rubber-like material in said chamber and substantially filling same whereby an annular portion of said sealing member is normally in the mouth of said chamber in a position for engaging a marginal part of said valve element thereby to be compressed; and a porous member of sintered compressed powdered metal in said chamber in engagement with said sealing member along an area separated from and substantially opposite to said mouth, there being an annular portion of such sealing member interposed between the latter area and such chamber mouth, said body having formed therein a passage for placing said porous member directly in communication with a region exterior to said structure.

5. In apparatus for providing a seal, a body defining a passage, an annular recess defined by said body opening into such passage via an annular mouth, an annular sealing member of deformable material positioned in such annular recess and substantially filling same, and a porous member positioned in such recess along a selected area of said annular sealing member, such selected area being substantially opposite to such mouth of said recess, said body also defining a second passage for placing said porous member in communication with the atmosphere.

6. In apparatus for providing a seal, a body having a passage therein; an annular recess defined by such body opening into such passage via an annular mouth, such recess being coaxial with such passage, an annular sealing member of deformable material positioned in such recess and substantially filling same, and a porous member positioned in such recess substantially opposite to such mouth and along a selected area of said annular sealing member, there being portions of such sealing member interposed between said selected area and the area of such sealing member which is in the mouth of such recess and hence exposed to said passage, said porous member being in communication with the atmosphere via a passage in said body.

7. In a valve structure, a valve body having a passage therein; a valve element axially movable in such passage; an annular recess defined by said body and opening into such passage via an annular mouth; an annular sealing member of deformable material in and substantially filling such annular recess; and a porous member positioned in such recess substantially opposite to such mouth and along a selected area of said annular sealing member, there being a substantial portion of such sealing member interposed between said selected area and the area of said sealing member which is exposed to such passage, said porous member being in communication with the atmosphere via a passage in said valve body, said annular sealing member being engageable by said valve element in response to axial movement of said element in such passage.

References Cited in the file of this patent

UNITED STATES PATENTS

| | | |
|---|---|---|
| 2,005,055 | Sprague | June 18, 1935 |
| 2,621,011 | Smith | Dec. 9, 1952 |
| 2,673,062 | Cornelius | Mar. 23, 1954 |
| 2,676,782 | Bostock | Apr. 27, 1954 |
| 2,713,989 | Bryant | July 26, 1955 |
| 2,722,402 | Crookston | Nov. 1, 1955 |
| 2,847,182 | Mancusi | Aug. 12, 1958 |